Feb. 16, 1937.  V. W. PETERSON  2,070,805
CYLINDER
Filed Dec. 18, 1934
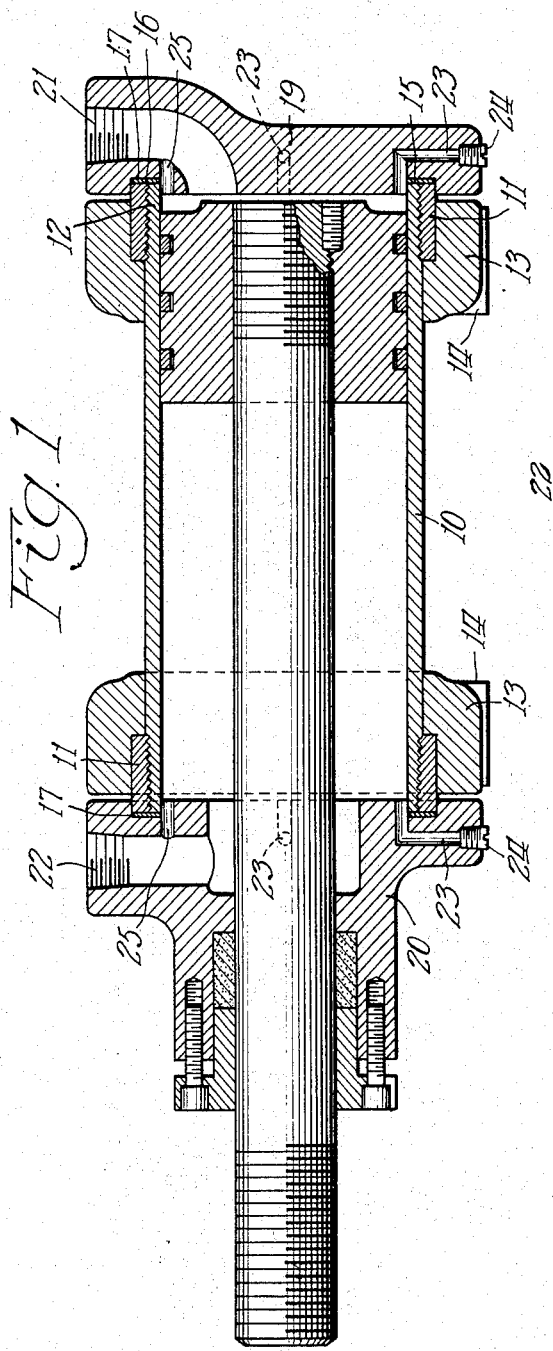
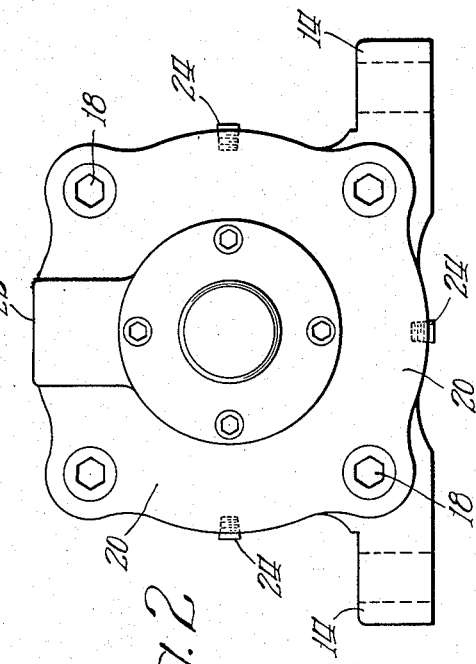
Inventor
Victor W. Peterson
By:
Roland C. Rehm
Atty.

Patented Feb. 16, 1937

2,070,805

UNITED STATES PATENT OFFICE 2,070,805

CYLINDER

Victor W. Peterson, Chicago, Ill., assignor to Hannifin Manufacturing Co., Chicago, Ill., a corporation of Illinois Application December 18, 1934, Serial No. 758,106

2 Claims. (Cl. 121—1)

This invention relates to hydraulic and other cylinders and among other objects aims to simplify and improve the methods of manufacture and the structural details of such cylinders.

The nature of the invention may be readily understood by reference to one illustrative construction embodying the invention and shown in the accompanying drawing.

In said drawing:

Fig. 1 is a longitudinal section of the cylinder; and

Fig. 2 is an end elevation thereof.

Existing manufacturing practices have not provided a simple and inexpensive cylinder design which is sufficiently flexible for present industrial needs. For example, cast cylinders are generally suitable only for low pressures and where no changes in detail are necessary to adapt the same for use in particular apparatus. Cylinders employing tie-rods to hold the heads or caps are not only unsightly, but leak. It is difficult particularly with the longer cylinders to maintain a tight seal since the tie-rods elongate under load but the cylinder does not. Objections also exist as regards other known methods of attachment of cylinder heads.

The present invention provides a design of cylinder which is flexible in use, and variations in length, diameter, and details of mounting do not involve the expense inherent in other designs. As here shown, the cylinder itself is formed of a plain cylindrical body 10 such as wrought-iron pipe. For exceedingly high pressures, other types of plain walled tubing may be used. For all pressures up to 1500 lbs. per square inch, commercial wrought-iron pipe may advantageously be used particularly since it is available in a large variety of sizes and in practically any desired length.

After having been cut to the length desired for a given cylinder, the plain pipe or tubing is prepared at each end for retaining collars 11. Such collars may advantageously be attached simply by screw threading the collars and each end of the pipe as at 12 with conventional threads and by conventional methods. Before applying the collars, rings 13 are slipped over the cylinder. These rings fit the cylinder with enough clearance to be rotatable thereon and may advantageously incorporate integrally or otherwise the mounting lugs 14 by which the cylinder is mounted in place. The rings also are bored or tapped to receive the cylinder head bolts as presently described. Thereupon the retaining collars 11 are screwed on the cylinder and the internal diameter of the latter is then finished to size by boring and honing. The finished cylinder is then mounted in a lathe or any other appropriate machine and centered in relation to its finished bore to permit the machining of the collars 11 and the end faces 15 of the cylinder body square and concentric with the cylinder bore. The combined area of the ends of the cylinder and collars provides an adequately wide finished seat 16 for gaskets 17 for sealing the cylinder heads.

Preferably the rings 13 are provided with a series of equidistant bores or tapped holes for the reception of retaining bolts or studs 18. In this instance four equidistant and symmetrically spaced bolts are employed, thus making it possible to attach the cylinder heads or caps 19 and 20 independently in any of four positions with reference to the mounting lugs. Thus the inlet ports 21 and 22 in the respective cylinder heads may be located at the top, bottom, or either side of the cylinder, depending upon piping and other details of the particular installation. Preferably the cylinder heads are also provided with vent passages 23 closed by plugs 24 at each of their sides (except that carrying the inlet ports) so that regardless of the location of the inlet port at the sides or bottom of the cylinder, a vent opening will always be located in topmost position. The unused vent ports remain closed by the plugs 24. If the inlet ports be in topmost position, the small short passages 25 render it possible completely to vent the cylinder through them.

The above construction also makes it possible to locate the mounting lugs 14 in any desired position with reference to each other and also to the respective cylinder caps or to employ a ring without mounting lugs at one or both ends of the cylinder. Moreover, the type of mounting of the cylinder may be varied merely by changing the design of the rings 13 without requiring any modification of the cylinder caps or other details of construction. Either of the cylinder caps may be quickly removed to replace a gasket or for any other reason without disturbing the mounting of the cylinder or without causing the cylinder to collapse as is frequently the case with cylinders employing a tie-rod construction.

The details of the piston, piston-rod, and piston-rod packing construction have not been described since they are conventional and may be varied to suit particular designs.

It will be apparent from the foregoing that the illustrative cylinders may be used for a wide variety of industrial purposes, such as for all types of presses, pneumatic as well as hydraulic, and in installations where the cylinder is required to have a long stroke. Leakage incident to tie rods on long cylinders is avoided. Moreover, without change in design the cylinder may be installed with its mounting lugs in any position,—top, bottom or side, independently of the cylinder head inlets and outlets and the latter may likewise be located in any position,—top, bottom or side, independently of the mounting lugs. Regardless of the location of the latter, it is always possible to locate a vent opening in uppermost position (in the event the inlet opening is not in such position) to permit the escape of air or other gases which may collect in the cylinder from time to time and which could not otherwise escape if the inlet and outlet openings were in other positions than uppermost.

Obviously the invention is not limited to the details of the illustrative construction since these may be variously modified. Moreover, it is not indispensable that all features of the invention be used conjointly since various features may be used to advantage in different combinations and subcombinations.

Having described my invention, I claim:

1. A cylinder of the character described comprising in combination a cylindrical body having open ends externally screw threaded, loose rings around and adjacent each end of said cylinder, external retaining collars screwed on the threaded ends of said body and of larger external diameter than the internal diameter of said rings to hold said rings against removal over the ends of said body, and cylinder caps provided with inlet passages and attached to said rings, said rings having mounting lugs and being rotatable relative to the cylinder and said caps to position the lugs in any desired mounting position, said rings and caps having a plurality of bolting holes arranged to register in a plurality of relative cap and ring positions, whereby said caps may be attached in any of a plurality of angular positions relative to said mounting lugs, said caps having a plurality of circumferentially distributed vent passages.

2. A cylinder of the character described comprising in combination a cylindrical body having open plain ends, a ring rotatably mounted on said body adjacent an end thereof, an external retaining collar fixed to said end of said body and serving to hold said ring against removal over that end of said body, an adjustable cylinder cap provided with a plurality of vent passages circumferentially distributed around the cap, said cap also having an inlet opening for operating fluid, means attaching said cap to said ring in one of a plurality of possible relative positions, said inlet opening and said vent passages being arranged relatively to said attaching means whereby to locate either a vent passage or said inlet opening uppermost as desired, and means closing unused vent passages.

VICTOR W. PETERSON.